United States Patent [19]

Svendsen

[11] Patent Number: 4,511,122
[45] Date of Patent: Apr. 16, 1985

[54] DEEPWATER KING CRAB POT LINE HAULER

[75] Inventor: Robert A. Svendsen, Seattle, Wash.

[73] Assignee: Marine Construction & Design Co., Seattle, Wash.

[21] Appl. No.: 537,863

[22] Filed: Sep. 30, 1983

[51] Int. Cl.³ .............................................. B66D 1/08
[52] U.S. Cl. .................................. 254/332; 254/361; 254/383; 254/394
[58] Field of Search .............. 254/288, 332, 361, 383, 254/394, 401, 402, 403, 404, 406, 407, 408, 409, 412, 415; 226/200; 43/8, 4.5

[56] References Cited

U.S. PATENT DOCUMENTS

| | | | |
|---|---|---|---|
| 452,226 | 5/1891 | Leuzinger | 254/407 X |
| 1,185,535 | 5/1916 | Purdy | 254/411 |
| 2,910,272 | 10/1959 | Nicola | 254/409 |
| 2,947,516 | 8/1960 | Jackson | 254/332 X |
| 3,032,322 | 5/1962 | Lawrence | 254/336 |
| 3,034,767 | 5/1962 | Gordon | 254/327 |
| 3,750,970 | 8/1973 | Tremoulet | 254/288 X |
| 3,807,696 | 4/1974 | Brda | 254/391 |
| 3,819,155 | 6/1974 | Smith | 254/361 X |
| 3,964,730 | 6/1976 | Demmert | 254/393 X |
| 4,005,852 | 2/1977 | Schmitmeyer et al. | 254/383 X |
| 4,165,830 | 7/1978 | Svendsen | 226/187 |
| 4,354,667 | 6/1979 | Svendsen | 254/332 |

Primary Examiner—Stuart S. Levy
Assistant Examiner—Joseph J. Hail, III
Attorney, Agent, or Firm—Christensen, O'Connor, Johnson & Kindness

[57] ABSTRACT

A crab pot line hauler in which an upright sheave support plate in the hauler head assembly is configured to serve as a continuing part of an outboard-extending cantilever swiveling support extending laterally from an upright post, and also to serve as a combined water splash guard and line loop whip guard for the hauler sheave, the multifunction support plate leaves the sheave open around its periphery for viewing of the line and ready accessibility to the line in order to clear it of incoming line knots and debris.

9 Claims, 5 Drawing Figures

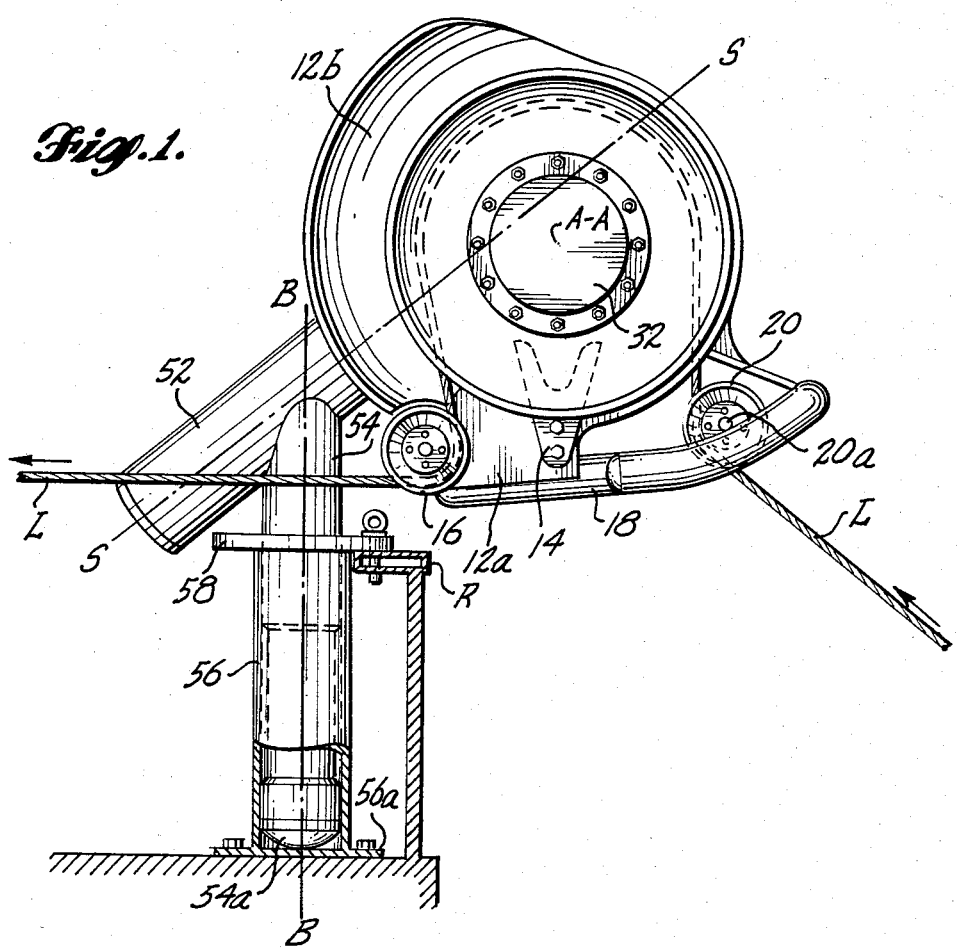
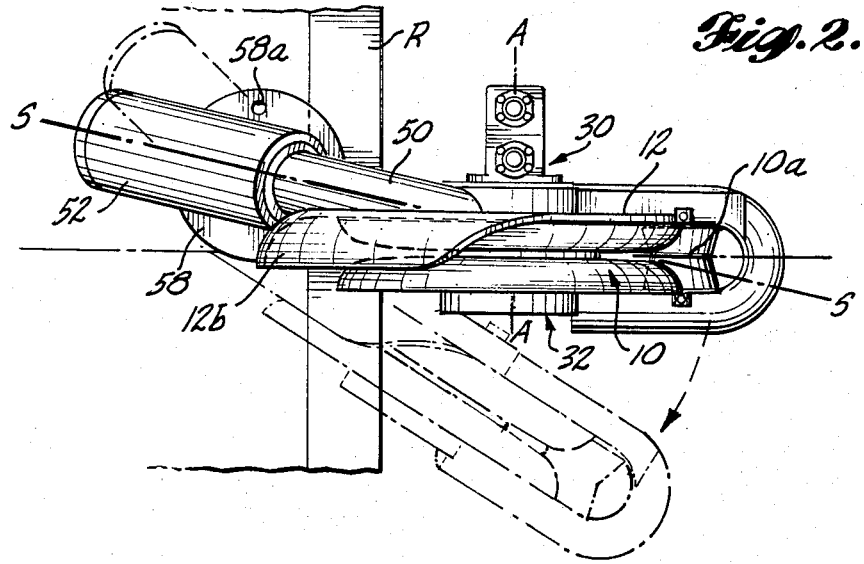

DEEPWATER KING CRAB POT LINE HAULER

BACKGROUND

This invention relates to an improved crab pot line hauler, and more particularly to a device suitable for extending the North Pacific king crab fishery into deeper ocean waters with the attendant problems of increased size and length of line, heaviness of gear, and greater hauling rates required to satisfy economics of the operation. The invention is herein illustratively described by reference to its presently preferred embodiment; however, it will be recognized that certain modifications and changes with respect to details may be made without departing from the essential features involved.

The present invention utilizes certain concepts featured in U.S. Pat. No. 4,354,667. Gordon U.S. Pat. No. 3,034,767 and the subsequent Svendsen U.S. Pat. No. 4,165,830 constitute additional background.

In expanding the North Pacific king crab fishery now into waters 1200 feet and more in depth, the greater hauling rates required for economic practicality and the longer and heavier lines used at those depths impose more critical demands on the hauler, considering such factors as greater hauler size and weight, operating personnel safety, and consistency of operating performance. For instance, with the heavier lines coming in at much faster speed (500-600 ft. per minute) than heretofore, the rate at which line knots and fouling entanglements must be seen and quickly cleared by the attendant fisherman places prime importance on ready accessibility to the incoming line. Attending this, safety precautions become even more critical, since the fisherman must stand close to perform these functions without becoming drenched with line spray or subjected to undue danger due to "flying" line loops and knots. A major object of this invention, therefore, is to provide a further improved king crab pot line hauler or the like efficiently convenient and safe for use by fishermen.

A further object hereof is to devise such a hauler of simple and compact construction having a low center of gravity and low height of projection above deck level on the carrier vessel.

Still another objective is to provide a hauler mechanism in which line fouling problems are minimized while affording open visibility of the passing line and ready access to the line when knots and debris are to be cleared. At the same time, protection of the monitoring fisherman against water thrown from the line or entanglement loops and debris whipping outwardly as the line rounds the rapidly turning sheave is to be achieved.

SUMMARY OF THE INVENTION

In accordance with the present invention, the line hauler sheave is mounted on one side of a specially configured support plate as are line guide rollers beneath the sheave's outboard and inboard lower quarters, the upper end inboard portion of the plate being curved out of its general body plane to overlie the adjacent peripheral portion of the hauler sheave and serve as a splash and line guard. This configuration leaves an open-access hauler sheave groove, yet strengthens and stiffens the support plate to function in different planes of loading as an extension of a cantilevered swivel shaft projecting outward directly from a journalling tube fixed on the upper end of a mounting base or post. In the improved hauler, the added height, weight and complicating structural mountings of a davit-hung swiveling support structure for the hauler head assembly are avoided and, with them, places for human injuries and for line loops and knots to become caught. With the apparatus retracted inboard into stowage position about the upright axis of the mounting post, minimum deck space is consumed.

BRIEF DESCRIPTION OF THE DRAWINGS

FIG. 1 is a side view of the hauler installed and operating, while

FIG. 2 is a top view,

DETAILED DESCRIPTION OF THE PREFERRED EMBODIMENT

Figure 3:
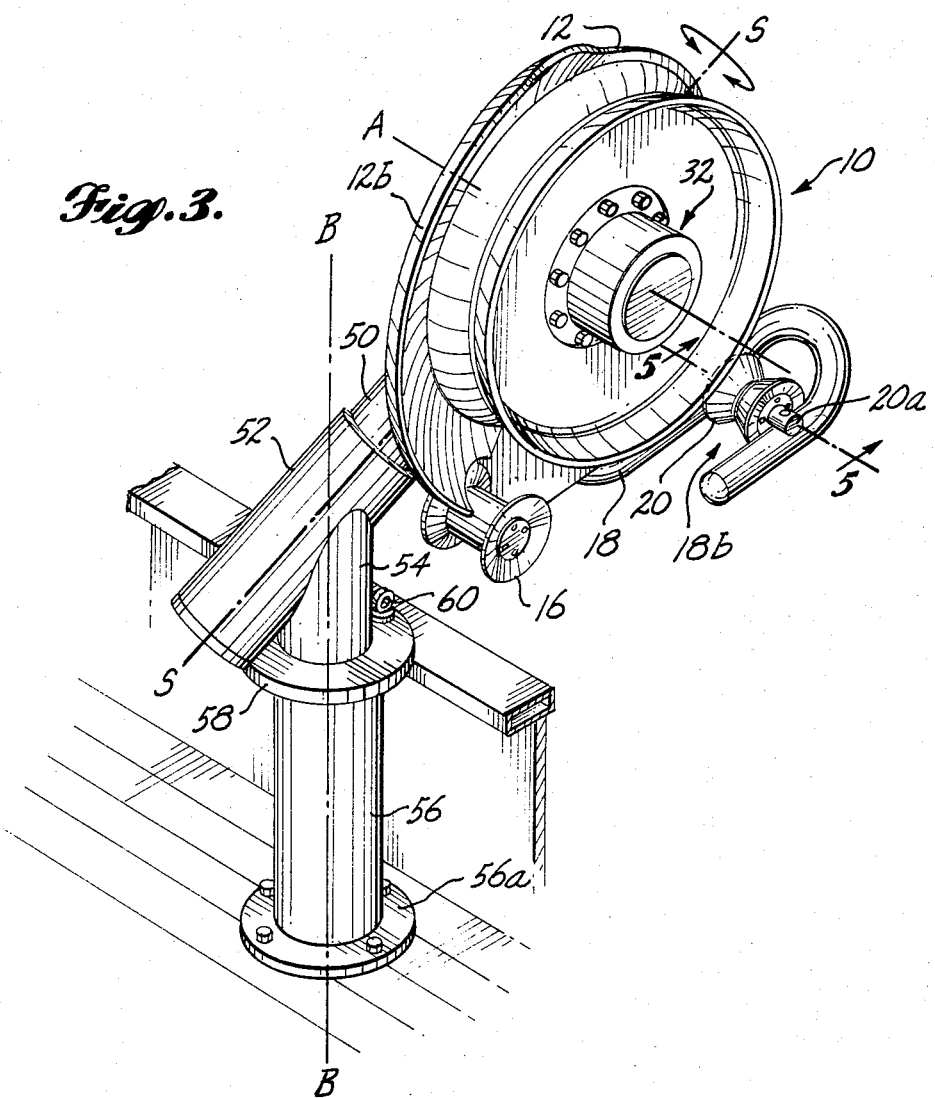
FIG. 3 is a top perspective view from one side.
Figure 4:
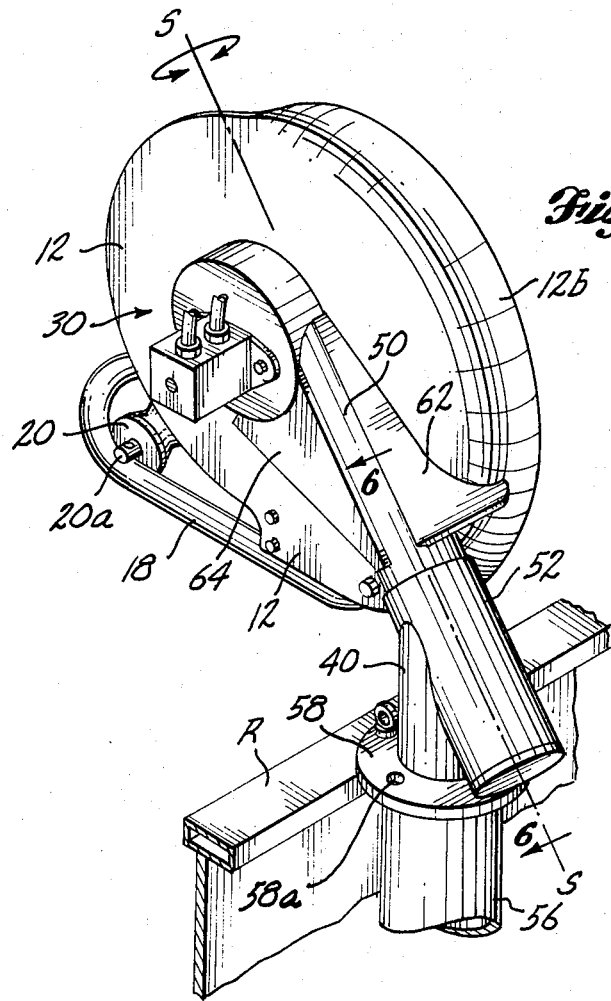
FIG. 4 is a top perspective view from the opposite side of the same.

As shown, hauler sheave 10 has a sharply reentrant V-groove 10a around its periphery that widens radially at a progressively increasing rate approaching the rim so as to receive and frictionally engage king crab pot warp or line L with the effect described in U.S. Pat. No. 4,354,667. Sheave 10 is rotatably mounted closely adjacent the flat main body portion of support plate 12 with the body plane of the plate and the sheave plane substantially parallel. The flat main body portion of plate 12, normally lying in a substantially vertical plane, with sheave axis A—A horizontal, has a downwardly projecting lower tab portion 12a mounting a line splitter 14 projecting upwardly into the sheave groove 10a, which performs in a conventional manner to peel pot line out of the groove if it sticks in the sheave groove. Tab portion 12a also mounts an off-bear line guide roller 16 coplanar with the sheave and lying beneath its lower inboard quarter so as to lead line L away from the sheave to a line coiler or other stowage device (not shown) during hauling operations. Also mounted on the tab portion 12a, as by welding the same to it, is the longer leg of a generally horizontal J-shaped line guide 18 forming an incoming line guide port 18b between the legs of the J-shaped member. The opposite ends of a support shaft 20a for an incoming line guide roller 20 are secured to opposite side arms of the member 18. Roller 20 has a reentrant groove coplanar with that in hauler sheave 10. Incoming pot line L being hauled by hauler sheave 10 is required to pass between the sides of the J-shaped guide 18 and, when approaching the hauler from an inclined direction, is required to run in the groove of the free-turning roller 20 so as to minimize line wear, all as shown.

Figure 5:
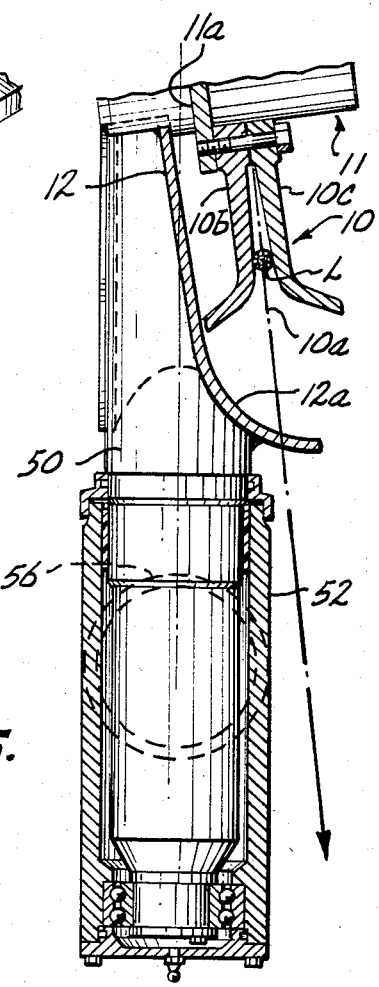
FIG. 5 is an enlarged fragmentary sectional view taken on line 6—6 in FIG. 4.

Also mounted on the main body portion of support plate 12 are the hydraulic drive motor unit 30 and associated drive reduction gear unit 32 for driving the hauler sheave 10. These units preferably are located on respectively opposite sides of the support plate for purposes of balance, as described in U.S. Pat. No. 4,354,667. As depicted in FIG. 5, hauler sheave 10 preferably is made of two mutually complemental side parts 10b and 10c having hubs bolted together and to the support member 11a of reduction gear drive unit 32 driven by hydraulic motor unit 13. The components thus far described, including the hauler sheave 10, support plate, sheave drive units, and associated line guide rollers, comprise what is referred to as the hauler head assembly.

The hauler head assembly is cantilevered laterally outward directly from an upright support base 40 mounted above and adjacent the rail R of the carrier fishing vessel. Position of the hauler head assembly on the post is such that at least the incoming line guide means 18 projects outboard 20 clear of the side of the vessel so as to keep the incoming line clear of the side of the vessel during a haul. The cantilever arm-type support means for the hauler head assembly also serves to rotatively support the hauler head assembly about an outwardly inclined swivel axis S—S oriented at an acute angle to the upright axis B—B of support base 40. The preferred cantilever mount for the hauler head comprises the specially configured hauler head support plate 12 rigidly mounted on rotary shaft 50 as an endwise extension of the shaft. The shaft, in turn, is rotatably supported by the elongated bearing tube 52 rigidly mounted in transverse position on the upper end of the mounting base 40.

Base 40 is preferably in the form of an upright post 54 rotatively received in an upright tubular socket 56 so as to permit revolving the assembly about upright axis B—B, defined by the base socket 56, in order to shift the post-mounted hauler head between extended (outboard) operating position and retracted (inboard) stowed position. Preferably, the socket tube 56 is welded to a bottom plate 56a fastened to the deck of the vessel. The padded lower end 54a of post 54 bears on plate 51a to carry the weight of the hauler system. A horizontal flange 58 on the post 54 at an intermediate heightwise location bears against the top face of rail R or other suitable steadying means. As a convenient way of holding the post rotated about axis B—B with the hauler deployed or retracted, the flange 58 is apertured at two or more locations 58a so as to permit passing a support and locking pin 60 downwardly through the flange and through aligned holes (not shown) through the rail R. This may also serve as a means to add steadiness to the post. In FIGS. 1-3, the hauler head assembly is shown in operating position projecting partly outwardly beyond the side of the vessel with pin 60 in place; whereas in order to retract the unit by swinging it inboard, the pin 60 is pulled and the entire unit rotated about axis B—B until the desired inboard (usually rail paralleling) stowed position is reached, at which point the pin 60 may be placed in a second hole 58a now in registry with a complemental hole in rail R so as to lock the apparatus against further shifting. It will be readily apparent that other position holder arrangements for the hauler may be used and that the particular choice or design may depend upon the customized needs of a particular vessel.

Cantilever support shaft 50 rotatably journaled in tubular bearing sleeve 52 is welded or otherwise rigidly joined to the side of the support plate 12 opposite the sheave 10. This is done with the hauler head assembly center of mass (for example, in the vicinity of sheave axis A—A) offset downwardly from swivel axis S—S. The amount of downward offset is sufficient to allow gravity to maintain the sheave plane substantially vertical in the operating position of the device, absent forces tending to swivel it one way or the other about such axis. Yet, the amount of offset between such center of mass of the hauler head and the swivel axis S—S is not so great as to permit the unit to swing pendulously and dangerously about the axis on a rolling or pitching vessel as in the device of U.S. Pat. No. 4,354,667. Also as in the last aforesaid patent, with the hauler head free to swivel about axis S—S, and easily swiveled due to proximity of the center of gravity to axis S—S, line tension forces in the pot line being drawn upwardly out of the water in a direction lateral to a vertical plane through the hauler head cause the sheave plane to be swiveled substantially into coalignment with such line during hauling. Initially, because of moment of inertia, such line forces apply bending load transverse to the support plate 12, thereby reducing it to bear cantilever loads transversely as well as in its main body plane. Such transverse bending loads can occur cyclically as the vessel rolls or pitches during line hauling.

In the present device, load forces are handled and the objectives described above are served in part by employing a specially configured support plate mount for the hauler sheave along with its associated power drive unit and associated guides. The upper, inboard portion of the plate is curved out of the main body plane of plate 12 to arch over the corresponding grooved rim portion of the sheave. This curved portion 12b serves as a low-cost, lightweight reinforcement for the support plate against lateral bending under cantilever loads applied to it, and it also serves as a protection splash guard and line shield for the bystanding fisherman required to monitor for line knots, weakness points and snarls needing attention. For accessibility to a line in the sheave groove, the shielding reinforcing portion of the plate leaves the sheave rim open at one side. To serve in adding cantilever load capacity, the plate's laterally curved portion 12b need only extend around the inboard upper portion thereof, starting in the vicinity of the off-bear guide pulley 16 and continuing from there peripherally of the hauler sheave to a loction near the top of the hauler sheave where it tapers off. As it tapers off, it further opens the side of the hauler over the sheave for line viewing and access convenience, yet lateral load-bearing capability is not thereby impaired, nor are required splash guard and line guard protection functions impaired. Thereafter, the edge portion of the support plate 12 follows the peripheral curvature of the hauler sheave rim down to the tab 12 as shown.

Further support stiffening is added by a reinforcing backing plate or web 62 extending lengthwise of rotary shaft 50 and joined to the plate and to shaft, as by welding, such that it bridges between such shaft and the backside of the support plate 12b. A second reinforcing web 64 also extending along and welded to the shaft 50 is joined, as by welding, to the housing of drive motor unit 30 as shown.

It will also be recognized, once again, that the incoming line receives the necessary guidance into and from engagement with the driven hauler sheave, with no part or juncture of parts of the support structure for the hauler head presenting a protrusion or a trap likely to catch line knots or snarls. Nothing in the novel cantilevered support plate and swiveling cantilevered mounting arm draft extending into that plate either obstructs or interferes with clear open-sided visibility of the hauler sheave and of the line required to pass around it.

These and other features and aspects of the invention have been shown and described in the presently preferred embodiment of the invention, and are embodied in the invention as claimed below with the understanding that the claims are intended to cover the new and improved line hauler and its equivalent forms.

The embodiments of the invention in which an exclusive property or privilege is claimed are defined as follows:

1. A line hauler for deep water hauling of king crab pots and the like aboard a fishing vessel, comprising: an upright mounting base; means to position the mounting base adjacent the rail of a fishing vessel; a hauler head assembly comprising a support plate having a body plane, a line hauler sheave mounted on said support plate adjacent one side thereof to rotate on an axis transverse to said support plate in a sheave plane substantially parallel to said body plane, power drive means for the sheave mounted on said support plate, and incoming line guide means mounted on the support plate substantially in said sheave plane; and support means for said hauler head asembly, including said support plate cantilevering said assembly directly from said mounting base so as to project laterally therefrom in a generally outboard direction along an outwardly inclined swivel axis, said swivel axis intersecting said body plane at an acute angle so as to offset said sheave plane from said upright mounting base, said support means further including first and second interengaged cantilevering support members, one received within the other to rotate freely therein about said swivel axis with one such member fixed on the mounting base and the other such member fixedly projecting from the support plate as a cantilever arm continuation thereof, said support means member fixed to the support plate being positioned relative thereto so as to locate the center of mass of the hauler head assembly below the swivel axis sufficiently that the hauler head assembly tends to assume a position with the hauler sheave substantially vertical, but with said center of mass not so far below such swivel axis as to incur appreciable pendulous swinging of the hauler head assembly about the swivel axis in heavy seas, said incoming line guide means being offset below the swivel axis such that tension in the incoming stretch of pot line being hauled swivels the hauler head assembly ongoingly into subsantial alignment of the sheave plane with the incoming line.

2. The line hauler defined in claim 1, wherein the mounting base comprises an upright post-like member and the support means first and second members respectively comprise a shaft projecting generally inboard and downwardly from the support plate and a tubular member fixedly mounted transversely at an incline on the top of the post and rotatively receiving the shaft to project generally outboard with cantilever support therefrom.

3. The line hauler defined in claims 1 or 2, wherein the support plate extends in its body plane radially outward in relation to the sheave axis substantially to a line of circumference adjacent the rim of the sheave and along an arcuate extent of that line commencing in the vicinity of the swivel axis and continuing upwardly and in an outboard direction peripherally along the top of the sheave, and extends further radially outward beyond the sheave rim while curving laterally to arch over the sheave rim at line-clearing distance from the rim so as to serve as both a splash guard and as a transverse bending stiffener for the support plate.

4. The line hauler defined in claims 1 or 2, wherein the support plate extends in its body plane radially outward in relation to the sheave axis substantially to a line of circumference adjacent the rim of the sheave and along an arcuate extent of that line commencing in the vicinity of the swivel axis and continuing upwardly and in an outboard direction peripherally along the top of the sheave, and extends further radially outward beyond the sheave rim while curving laterally to arch over the sheave rim at line-clearing distance from the rim so as to serve as both a splash guard and as a transverse bending stiffener for the support plate, said support plate having a lower tab portion extending downwardly from said line of circumference along an arcuate extent of the line below the sheave, and an off-bear line guide means mounted on said tab portion in substantially coplanar relationship with the hauler sheave.

5. The line hauler defined in claims 1 or 2, wherein the support plate extends in its body plane radially outward in relation to the sheave axis substantially to a line of circumference adjacent the rim of the sheave and along an arcuate extent of that line commencing in the vicinity of the swivel axis and continuing upwardly and in an outboard direction peripherally along the top of the sheave, and extends further radially outward beyond the sheave rim while curving laterally to arch over the sheave rim at line-clearing distance from the rim so as to serve as both a splash guard and as a transverse bending stiffener for the support plate, said support plate having a lower tab portion extending downwardly from said line of circumference along an arcuate extent of the line below the sheave, and an off-bear line guide means mounted on said tab portion in substantially coplanar relationship with the hauler sheave, and wherein the support means member is fixed to the support plate and is fixed thereto on the side thereof away from the hauler sheave and projects therefrom at an acute angle to the support plate body plane.

6. A deep water line hauler comprising a hauler head assembly including a V-grooved line hauler sheave, power means for driving the sheave for rotation in a sheave plane, and line guide means for leading line to and from the sheave during operation of the hauler, a first cantilever support member carrying the hauler head assembly, a second cantilever support member rotatably mounting said first cantilever support member as a continuation thereof, an upright base member fixedly mounted on the vessel, and a third cantilever support member rotatably engaging the base member and providing support to the second cantilever support member, the first cantilever support member projecting from said second cantilever support member and being rotatable about an inclined swivel axis transverse to said base member, said swivel axis formed by said first and second cantilever support members intersecting said sheave plane formed by the roational plane of the sheave at an acute angle so as to offset said sheave plane from said upright base member.

7. The line hauler defined in claim 6, wherein the first cantilever support member comprises an upright plate-like member having a body plane with the hauler sheave mounted on one side thereof in parallel relationship therewith, and means formed as a rigidifying continuation of said plate-like member curved out of said body plane into overarching relationship to the sheave along the inboard upper peripheral portion of the sheave so as to function also as a splash guard.

8. The line hauler defined in claims 6 or 7 wherein the incoming line guide means comprises means mounted projecting from the plate-like member in an outboard direction transverse to the post from a location generally beneath the hauler sheave, said latter means including generally parallel elements forming a line guide port between them generally aligned with the sheave.

9. The line hauler defined in claims 6 or 7, wherein the incoming line guide means comprises means mounted projecting from the plate-like member in an outboard direction transverse to the post from a location generally beneath the hauler sheave, said latter means including generally parallel elements forming a line guide port between them generally aligned with the sheave, and line guide roller means mounted to rotate freely in the space between the parallel elements and in coalignment with the hauler sheave.

* * * * *